United States Patent
Shibuya

[11] Patent Number: 5,925,294
[45] Date of Patent: Jul. 20, 1999

[54] PROCESS FOR THE PRODUCTION OF AN INTRAOCULAR LENS

[75] Inventor: Akihiko Shibuya, Tokyo, Japan

[73] Assignee: Hoya Corporation, Japan

[21] Appl. No.: 08/839,071

[22] Filed: Apr. 23, 1997

Related U.S. Application Data

[63] Continuation-in-part of application No. 08/815,709, Mar. 12, 1997.

[30] Foreign Application Priority Data

Apr. 24, 1996 [JP] Japan .................................. 8-102172

[51] Int. Cl.[6] ...................................................... B29D 11/00
[52] U.S. Cl. ............................................. 264/2.7; 425/808
[58] Field of Search ............................. 264/1.1, 2.1, 2.7; 623/6; 425/808

[56] References Cited

U.S. PATENT DOCUMENTS

| | | |
|---|---|---|
| 4,361,527 | 11/1982 | Rau . |
| 4,732,715 | 3/1988 | Bawa et al. . |
| 4,815,690 | 3/1989 | Shepherd . |
| 5,169,569 | 12/1992 | Ingram et al. . |
| 5,246,634 | 9/1993 | Ichikawa et al. .......................... 264/2.7 |
| 5,269,813 | 12/1993 | Yoshida et al. . |
| 5,611,968 | 3/1997 | Grisoni et al. ............................ 264/2.7 |
| 5,674,284 | 10/1997 | Chang et al. . |
| 5,725,574 | 3/1998 | Nguyen . |
| 5,762,837 | 6/1998 | Grisoni et al. ............................ 264/2.7 |

FOREIGN PATENT DOCUMENTS

| | | |
|---|---|---|
| 0 269 288 | 6/1988 | European Pat. Off. . |
| 0 435 525 A2 | 7/1991 | European Pat. Off. . |
| 0 637 503 A1 | 2/1995 | European Pat. Off. . |
| 4-212349 | 8/1992 | Japan . |
| 7-144000 | 6/1995 | Japan . |
| WO 94/04346 | 3/1994 | WIPO . |

*Primary Examiner*—Mathieu D. Vargot
*Attorney, Agent, or Firm*—Nixon & Vanderhye

[57] ABSTRACT

A one-piece intraocular lens made entirely of three-dimensionally crosslinked polymethyl methacrylate is prepared by selectively press-stretching a lens blank at a temperature of 125 to 140° C. in those areas around the periphery of the central effective optic area and from which the haptic portions are formed rendering areas more robust and less prone to fracture while the central effective optic area is not press-stretched. The lenses are durable to YAG laser irradiation.

5 Claims, 1 Drawing Sheet

PROCESS FOR THE PRODUCTION OF AN INTRAOCULAR LENS

CROSS-REFERENCE TO RELATED APPLICATIONS

This application is a continuation-in-part of application Ser. No. 08/815,709 filed Mar. 12, 1997.

FIELD OF THE INVENTION

The present invention relates to a process for the production of an intraocular lens, particularly to an intraocular lens having integral optic and haptic portions.

PRIOR ART

Intraocular lenses may be a two-piece intraocular lens (or sometimes called a three-piece intraocular lens) of which the haptic and optic portions are separately produced and combined; and a one-piece intraocular lens having integral haptic and optic portions.

Most of two-piece or three-piece intraocular lenses are composed of a haptic portion formed of polypropylene (PP) and an optic portion formed of polymethyl methacrylate or a methyl methacrylate copolymer (these will be generically referred to as "PMMA" in the present specification). In most one-piece intraocular lenses, the haptic portion and the optic portion are formed of PMMA.

With advances in mechanical processing, the main stream of intraocular lenses is shifting from two-piece intraocular lenses to one-piece intraocular lenses.

PMMA is used for an intraocular lens for its excellent bio-compatibility, mechanical processability and transparency properties. Due to these advantages, PMMA is very useful for an intraocular lens which is to be implanted in the eye.

On the other hand, PMMA is disadvantageous in that its mechanical properties are hard and fragile. The haptic portion of an integral intraocular lens formed of PMMA is likely to break under a load exerted on the haptic portion at the time of implantation.

To overcome this problem, a PMMA sheet is stretched to improve its strength. One method is that a PMMA sheet is multi-axially stretched under heat. In this method, facing margins of a PMMA sheet are clamped with a tool, the PMMA sheet is uniformly heated and the PMMA sheet is simultaneously stretched in directions of some axes to stretch and orient the PMMA sheet. When a stretched PMMA sheet is used, intraocular lenses are produced having integral haptic and optic portions and the haptic portion is free from breaking. The above method is disclosed, for example, in JP-A-4-212349.

Another method is blow stretching a PMMA sheet. In this method, the principle of stretch blow molding used for producing foods- and medicine-related containers applies. A PMMA sheet which is heat-plasticized is expanded to stretch and orient it by blowing in a hot fluid (air in a usual case). The above method is disclosed, for example, in U.S. Pat. No. 5,169,569.

Since these two methods or procedures of stretching a PMMA sheet are difficult, there is another method in which a PMMA sheet (in the form of a button) is press-stretched with a compression molding machine to improve PMMA's mechanical strength. This method is disclosed, for example, in JP-A-7-144000 and WO94/04346.

Another material for an intraocular lens is a three-dimensionally crosslinked PMMA. Three-dimensionally crosslinked PMMA refers to a network PMMA polymer obtained by reacting dimethacrylate of a polyhydric alcohol such as ethylene glycol dimethacrylate as a crosslinking agent when PMMA is produced by polymerization. The network PMMA polymer is clearly distinguishable from a conventional linear PMMA polymer. As a substance, three-dimensionally crosslinked PMMA has excellent stability and excellent durability against YAG laser. For the therapeutic treatment of adult cataract, a diseased portion is irradiated with YAG laser through an intraocular lens. When formed of conventional PMMA, the optic portion may crack, while the three-dimensionally crosslinked PMMA does not crack.

Three-dimensionally crosslinked PMMA is an advantageous material for an intraocular lens. Conventional stretching methods disclosed in the above publications do not use three-dimensionally crosslinked PMMA. That is because it is difficult to stretch three-dimensionally crosslinked PMMA since it has low thermoplasticity as compared with general linear PMMA. Further, since it has a crosslinked structure, it is considered difficult to improve strength even if it is stretched.

SUMMARY OF THE INVENTION

The present invention overcomes the above problems, and provides a process for the production of an integral intraocular lens which retains three-dimensionally crosslinked PMMA's excellent physicochemical stability and YAG laser durability, and provides strength to the haptic portion so that the haptic portion has improved breaking resistance.

Applicant's investigations have led to following conclusions:

(1) Three-dimensionally crosslinked PMMA can be press-stretched by carefully controlling the amount of crosslinking agent at the time of production and properly controlling the crosslinking degree.

(2) An integral intraocular lens having an effective optic area composed of a three-dimensionally crosslinked PMMA which has an appropriate degree of crosslinking but is not press-stretched and having a peripheral portion to the effective optic area and a haptic portion both composed of a three-dimensionally crosslinked PMMA which has the desired degree of crosslinking and is press-stretched, has excellent physicochemical stability and YAG laser durability. Further, the haptic portion has improved mechanical strength so that it is resistant to breaking.

(3) The intraocular lens described in above (2) can be obtained by polymerizing a monomer mixture of methyl methacrylate with a limited amount of a crosslinking agent to obtain a three-dimensionally crosslinked PMMA having an appropriate degree of crosslinking, press-stretching the obtained PMMA under heat with a press plate having a hole having a diameter equal to, or greater than, the diameter of the effective optic area and equal to, or smaller than, the outer diameter of the peripheral portion to the effective optic area until a press-stretched portion has a predetermined thickness, and subjecting the resultant product to further processing to form a completed intraocular lens.

(4) The heating temperature at the time of press-stretching is between; 125° C. and 140° C., and this provides the three-dimensionally crosslinked PMMA with desired fluidity so that an intraocular lens can be easily produced without production problems.

BRIEF DESCRIPTION OF DRAWINGS

FIG. 1(A) is a plan view of a one-piece intraocular lens, and FIG. 1(B) is a side view of the one-piece intraocular lens.

DETAILED DESCRIPTION OF THE INVENTION

Figure 1:
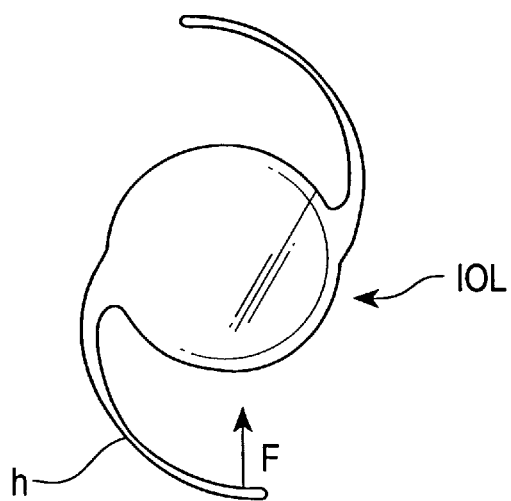
FIGS. 1(A) and 1(B) illustrate the tensile test in which a tension is applied at 30°.
Figure 1:
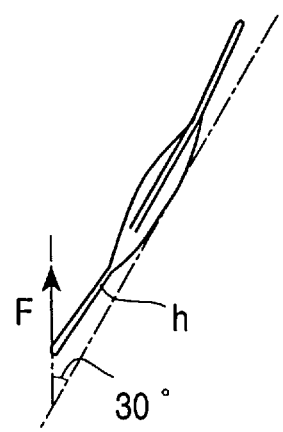

The present invention provides an improved process for producing an integral intraocular lens having an haptic portion an optic portion comprising an effective optic area surrounded by a peripheral portion, the optic portion and the haptic portion formed of a three-dimensionally crosslinked polymethyl methacrylate, which process comprises the steps of:

(a) polymerizing a monomer mixture containing 96 to 99.5 parts by weight of methyl methacrylate and 4 to 0.5 part by weight of a crosslinking agent, to obtain a three-dimensionally crosslinked polymethyl methacrylate material, (b) heating the three-dimensionally crosslinked polymethyl methacrylate material obtained in step(a) to a temperature of 125 to 140° C., and selectively press-stretching the three-dimensionally crosslinked polymethyl methacrylate, with a press plate having a hole having a diameter equal to, greater than, a diameter of the effective optic area and equal to, or smaller than, an outer diameter of the peripheral portion to the effective optic area to produce a press-stretched portion and a non-press-stretched portion, wherein the press-stretched portion has a thickness which is 45 to 70% of the thickness of the three-dimensionally crosslinked polymethyl methacrylate material which is not heated, to obtain a press-stretched material, and (c) processing the press-stretched material obtained in step(b) to constitute the effective optic area in a non-press-stretched portion corresponding to a position of the hole of the press plate and the peripheral portion and the haptic portion in the press-stretched portion which does not correspond to the position of the hole of the press plate.

EXAMPLES

The present invention will be further explained and illustrated with reference to the following examples.

Example 1

Example 1 used the following materials.

Methyl methacrylate (MMA) 98.0 parts by weight

Crosslinking agent, ethylene glycol dimethacrylate (EDMA) 2.0 parts by weight

Polymerization initiator, azobisisobutyronitrile (AIBN) 0.05 part by weight

UV absorbent, 2-(2'-hydroxy-3'-tert-butyl-5'-methylphenyl)-5-chlorobenzotriazole 0.05 part by weight Yellow dyestuff, C.I. (color index) Solvent Yellow 16 0.01 part by weight A monomer mixture of the above materials was polymerized in a polyethylene pipe having an inner diameter of 20 mm to obtain a three dimensionally crosslinked PMMA material. A cylindrical sample having a diameter of 16 mm and a thickness of 7 mm was taken from the above material. The sample was placed in a compression molding machine and heated at 135° C., and the temperature of 135° C. was maintained for 15 minutes. Then, a press plate was lowered and preliminarily pressed on the cylindrical sample at a pressure of 2 kg/cm$^2$ twice. Further, the cylindrical sample was pressed with the press plate at a pressure of 25 kg/cm$^2$.

In this case, a brass spacer having a thickness of 3.5 mm was placed on a sample bed. Then, while the pressure of 25 kg/cm$^2$ was maintained, water was circulated in the compression molding machine to cool the sample to room temperature.

The press-stretching procedure under heat provided a press-stretched material having a thickness of 50% based on the thickness of the material before heating. In the above case, the heating temperature was set at 135° C. at which the crosslinked PMMA material had the desired fluidity, so that the press-stretching treatment was smoothly carried out and that the press-stretched material was free from cracking, damage and whitening. Then, the pressure was removed, the press plate was moved upward, and the press-stretched material was taken out.

The above-obtained press-stretched crosslinked PMMA material was processed into a button for an integral intraocular lens, to show that the processing was smoothly carried out without causing any damage on the button.

Then, an integral intraocular lens having an effective optic area formed of the non-press-stretched portion and having a peripheral portion and a haptic portion both formed of the press-stretched portion was produced from the above-obtained button for an integral intraocular lens, and the physical properties of the integral intraocular lens were tested. Further, in the Referential Example, the same three-dimensionally crosslinked PMMA material as that obtained by the polymerization in Example 1 was formed into an integral intraocular lens without press-stretching it, and the physical properties of the obtained intraocular lens were also tested.

(1) Strength of haptic portion (i) Tensile strength in a direction at 30°

FIGS. 1(A) and 1(B) show the tensile test in which tension was applied in a direction at 30°. FIG. 1(A) shows a plan view of an intraocular lens, and FIG. 1(B) shows a side view of the intraocular lens. As shown in FIG. 1(B), the intraocular lens tested was tilted at an angle of 30° against a vertical axis. The central portion of the haptic portion was held, and pulled upward along the vertical axis (in a direction F indicated by an arrow in FIG. 1(A)) at a rate of 50 mm/min. And, a maximum load (g) when the haptic portion broke was determined.

(ii) Breaking test by press-bending

Figure 2:
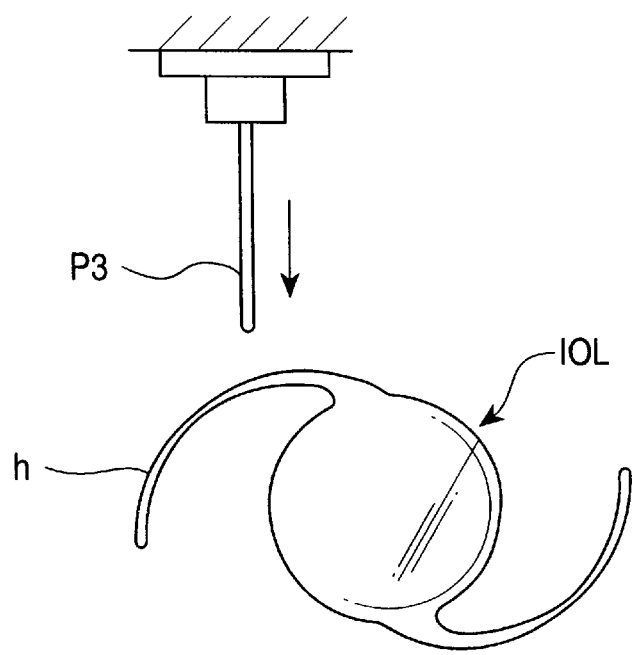
FIG. 2 illustrates the breaking test by press-bending.

FIG. 2 shows the breaking test by press-bending. In the breaking test by press-bending, while the bottom of the haptic portion of the intraocular lens was compressed with a narrow and long compressing rod at a rate of 50 mm/minute, it was observed whether or not the haptic portion would break.

(2) YAG laser durability

The optic portion of an integral intraocular lens was irradiated with YAG laser at different irradiation energy levels 10 times each. The irradiation energy levels were 2 mj, 4 mj and 7 mj.

The irradiated lens was examined through a stereomicroscope (SZH, supplied by Olympus Optical Co., Ltd.) to determine an occurrence ratio (%) of pits and cracking.

Table 1 shows the test results of the integral intraocular lens obtained by press-stretching the three-dimensionally crosslinked PMMA material at a compression ratio of 50% and mechanically processing it in Example 1 together with the test results of the intraocular lens obtained from the three-dimensionally crosslinked PMMA material (material not press-stretched) in Referential Example 1.

TABLE 1

| Example No. | Test of strength of haptic portion | | YAG laser durability Occurrence ratio (%) of pits and cracking Irradiation energy | | |
| --- | --- | --- | --- | --- | --- |
| | Tension in direction 30° (g) | Breaking by press-bending | 2 mj | 4 mj | 7 mj |
| Intraocular lens obtained in Ex. 1 (press-stretched product) | 234.1 | Not broken | 0 | 0 | 10 |
| Intraocular lens in Referential Example (non-press-stretched product) | 75.1 | Totally broken | 0 | 0 | 10 |

The results in 1 show the following: In Referential Example, the intraocular lens obtained from the three-dimensionally crosslinked PMMA material (material not press-stretched) in Referential Example was excellent in YAG laser durability since it Was formed of the three-dimensionally crosslinked PMMA material. However, it was fragile, which is an inherent property of PMMA. In the strength tests of the haptic portion, therefore, it was broken under a small load in the tensile test in a direction at 30°, and it was totally broken in the breaking test by press-bending.

On the other hand, in the tests of strength of the haptic portion, the intraocular lens obtained from the material prepared by press-stretching the three-dimensionally crosslinked PMA material at a compression ratio of 50 % in Example 1 showed high strength in the tensile test in a direction at 30°, and no sample was broken in the breaking test by press-bending. Further, since it had a crosslinked structure, almost no pit or cracking occurred in irradiated spots in the test of durability against YAG laser.

Comparative Examples 1 and 2

Press-stretched crosslinked PMMA materials were obtained in the same manner as in Example 1 except that the heating temperature at a press-stretching time was changed to 120° C. (Comparative Example 1) or 145° C. (Comparative Example 2). The press-stretched material obtained in Comparative Example 1 was damaged and cracked, and the press-stretched material obtained in Comparative Example 2 showed whitening and a crumbled state.

The press-stretched material obtained in Comparative Example 1 was processed into a button for an integral intraocular lens. However, the button was damaged, and it was difficult to produce an integral intraocular lens from the button. When attempts were made to produce an integral intraocular lens from the press-stretched material obtained in Comparative Example 2, the material was too fragile to process.

When the results of Example 1 in which the heating temperature at a press-stretching time was set at 135° C. and the results of Comparative Examples 1 and 2 in which the said temperature was set at 120° C. or 145° C. are compared, clearly, the heating temperature at a press-stretching time is critical, and the heating temperature must be in a range of 125 to 140° C. A heating temperature less than 125° C. results in a press-stretched material liable to be damaged or cracked, and when press-stretching is carried out with a press plate having a hole, damage occurs in the boundary between the non-press-stretched portion and the press-stretched potion of the material. As a consequence, it is not possible to produce an integral intraocular lens. When the heating temperature exceeds 140° C., the material is partly decomposed to a whitened or a crumbled state. As a consequence, it is not possible to produce an integral intraocular lens. In contrast, when the heating temperature is in the range of from 125 to 140° C., the press-stretched material is free of the problems which occurred in Comparative Examples 1 and 2, and an integral intraocular lens is produced having excellent strength in the haptic portion as well as durability against YAG laser.

The present invention has been explained with reference to Examples, while other embodiments not shown in Example of the present invention will be explained hereinafter.

(1) For producing three-dimensionally crosslinked PMMA, Example 1 used a mixture containing 98.0 parts by weight of methyl methacrylate and 2.0 parts by weight of a crosslinking agent. However, the amount of methyl methacrylate can be set in the range of from 96 to 99.5 parts by weight, and the amount of the crosslinking agent can be set in the range of from 4 to 0.5 part by weight. When the amount of the crosslinking agent is less than 0.5 part by weight, the crosslinked structure is too moderate to work properly. That is, the resulatant three-dimensionally crosslinked PMMA does not fully exhibit the required properties such as YAG laser durability and physicochemical stability which are properties of an IOL-acceptable three-dimensionally crosslinked PMMA. When the amount of the crosslinking agent exceeds 4 parts by weight, the crosslinking density is too large, and it is difficult to press-stretch the resultant three-dimensionally crosslinked PMMA. Further, even if the three-dimensionally crosslinked PMMA is press-stretched, the mechanical strength does not increase, or in some cases the three-dimensionally crosslinked PMMA shows a decrease in mechanical strength.

(2) The following monomers may be used as required in combination with methyl methacrylate used in Example 1, for producing the three-dimensionally crosslinked PMMA. A methacrylate ester such as ethyl methacrylate, n-butyl methacrylate, iso-butyl methacrylate or tert-butyl methacrylate, and an acrylate ester such as methyl acrylate, ethyl acrylate, n-butyl acrlylate, iso-butyl acrylate or tert-butyl acrylate. The following crosslinking agent maybe used in place of, or in combination with, the ethylene glycol dimethacrylate (EDMA) used in Example 1. Diethylene glycol dimethacrylate, triethylene glycol dimethacrylate, tetraethylene glycol dimethacrylate or trimethylolpropane trimethacrylate.

(3) Example 1 used azobisisobutyronitrile (AIBN) as a polymerization initiator, while the polymerization initiator may be azobisdimethylvaleronitrile, benzoyl peroxide, di-tert-butyl peroxide or lauroyl peroxide.

(4) Besides the UV absorbent used in Example 1, the UV absorbent may be benzotriazole-containing absorbents such as 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2'-hydroxy-3',5'-di-tert-butylphenyl)-5-chlorobenzotriazole, 2-(2'-hydroxy-3',5'-di-tert-amylphenyl)benzotriazole, and 2-(2'-hydroxy-4'-octoxyphenyl)benzotriazole, salicylic acid-containing absorbents such as phenyl salicylate, p-tert-butylphenyl salicylate and p-octylphenyl salicylate, and benzophenone-containing absorbents such as 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4-dimethoxybenzophenone, and 2-hydroxy-4-methoxy-5-sulfonebenzophenone.

(5) In addition to that used in Example 1, the yellow dyestuff may be

CI (color index) Solvent Yellow 29,

CI Solvent Yellow 33,

CI Solvent Yellow 44,

CI Solvent Yellow 56,

CI Solvent Yellow 56,

CI Solvent Yellow 93, and

CI Disperse Yellow 3.

Further, it also may be a yellowish brown colorant such as

CI Solvent Yellow 14,

CI Solvent Yellow 104,

CI Solvent Yellow 105,

CI Solvent Yellow 110,

CI Solvent Yellow 112,

CI Solvent Yellow 113, and

CI Solvent Yellow 114.

(6) In Example 1, the press plate had a hole having a diameter (diameter of non-press-stretched portion) of 5.5 mm. However, the diameter of the hole of the press plate may be equivalent to, or greater than, the diameter of the effective optic area and is equivalent to, or smaller than, the outer diameter of the peripheral portion to the effective optic area. The effective optic area of a typical intraocular lens has a diameter of 3 mm, and the total optic portion of the intraocular lens generally has a diameter (outer diameter of peripheral portion) of 5 mm to 7 mm. Therefore, the diameter of the non-press-stretched portion is usually in the range of from 3 mm to 7 mm.

(7) In Example 1, the three-dimensionally crosslinked PMMA material was heated and press-stretched such that its thickness decreased to 50% of the thickness of the material before heating. However, the thickness of the heated and press-stretched material may be in the range of 45 to 70% of the thickness of the material before heating.

The present invention provides a process which enables the convenient production of an integral intraocular lens having excellent physicochemical stability and YAG laser durability as well as excellent mechanical strength in the haptic portion.

What is claimed is:

1. An improved process for producing an integral intraocular lens having a haptic portion and an optic portion comprising an effective optic area surrounded by a peripheral portion, the optic portion and the haptic portion formed of a three-dimensionally crosslinked polymethyl methacrylate, which process comprises the steps of (a) polymerizing a monomer mixture containing 96 to 99.5 parts by weight of methyl methacrylate and 4 to 0.5 part by weight of a crosslinking agent, to obtain a three-dimensionally crosslinked polymethyl methacrylate material, (b) heating the three-dimensionally crosslinked polymethyl methacrylate material obtained in step(a) to a temperature of 125 to 140° C., and selectively press-stretching the three-dimensionally crosslinked polymethyl methacrylate, with a press plate having a hole having a diameter equal to, or greater than, a diameter of the effective optic area and equal to, or smaller than, an outer diameter of the peripheral portion to the effective optic area to produce a press-stretched portion and a non-press-stretched portion, wherein the press-stretched portion has a thickness which is 45 to 70% of the thickness of the three-dimensionally crosslinked polymethyl methacrylate material which is not heated, to obtain a press-stretched material, and (c) processing the material obtained in the above step to constitute the effective optic area in a non-press-stretched portion corresponding to a position of the hole of the press plate and the peripheral portion and the haptic portion in the press-stretched portion which does not correspond to the position of the hole of the press plate.

2. A process of claim 1, wherein a methacrylate ester or an arcrylate ester is used with the methyl methacrylate.

3. A process of claim 1, wherein the cross-linking agent is selected from the group consisting of ethylene glycol dimethacryate, diethylene glycol dimethacrylate, triethylene glycol dimethacrylate, tetraetylene glycol dimethacrylate and trimethylolpropane trimethacrylate.

4. A process of claim 1, wherein the monomer mixture is polymerized in the presence of a UV absorbent.

5. A process of claim 4, wherein the UV absorbent is selected from the group consisting of benzotriazole-containing absorbents, salicylic acid-containing absorbents and benzophenoru-containing absorbents.

* * * * *